United States Patent [19]

Hedel et al.

[11] Patent Number: 4,609,094
[45] Date of Patent: Sep. 2, 1986

[54] APPARATUS FOR SORTING CYLINDRICAL WORK PIECES HAVING A LONGITUDINAL FLAT ACCORDING TO THEIR ROTATIONAL ORIENTATION

[75] Inventors: Rudolph H. Hedel, West Windsor Township, Mercer County; William A. Dischert, Springfield Township, Burlington County, N.J.

[73] Assignee: RCA Corporation, Princeton, N.J.

[21] Appl. No.: 667,160

[22] Filed: Nov. 1, 1984

[51] Int. Cl.⁴ .............................................. B65G 47/24
[52] U.S. Cl. ................................. 198/380; 198/391; 209/625; 209/940; 221/172
[58] Field of Search ............... 209/539, 644, 659, 660, 209/625, 920, 940, 680; 198/391, 380, 394, 395, 398; 221/159, 172

[56] References Cited

U.S. PATENT DOCUMENTS

| | | | |
|---|---|---|---|
| 2,892,530 | 6/1959 | Fox | 198/398 |
| 3,064,808 | 11/1962 | Fricke | 209/644 |
| 3,439,792 | 4/1969 | Frank | 198/394 |
| 3,441,121 | 4/1969 | Pastuszak | 198/394 |
| 3,567,007 | 3/1971 | Maeda | 198/398 |
| 3,939,966 | 2/1976 | Szenczy | 198/391 |
| 3,997,065 | 12/1976 | Jaksch | 198/394 |
| 4,093,062 | 6/1978 | Sjogren | 198/380 |
| 4,282,965 | 8/1981 | Bates et al. | 198/380 |

FOREIGN PATENT DOCUMENTS 0823074  4/1981  U.S.S.R. .............................. 221/172

*Primary Examiner*—Randolph A. Reese
*Assistant Examiner*—Donald T. Hajec
*Attorney, Agent, or Firm*—Roland L. Morneau; Glenn H. Bruestle

[57] ABSTRACT

A device for sorting cylindrical work pieces having an axial flat comprising a vibrating track for transporting the pieces and a gate mounted over and across the track. The gate has an inverted V-shaped cut-out on its lower edge. The height of the cut-out allows the pieces resting on their axial flat to go through the gate and to stop the ones resting on part of their periphery other than the flat. The invention is particularly useful for sorting video and audio styli.

1 Claim, 3 Drawing Figures

APPARATUS FOR SORTING CYLINDRICAL WORK PIECES HAVING A LONGITUDINAL FLAT ACCORDING TO THEIR ROTATIONAL ORIENTATION

BACKGROUND OF THE INVENTION

Automated equipment handles work pieces so that the ones having the desired rotational orientation will be selected for an assembly purpose. The shape of the work pieces used in this invention is cylindrical with a longitudinal flat along its longitudinal axis. The work pieces are sorted so as to accept only the ones lying on their longitudinal flat. This invention is particularly suitable for sorting video or audio styli.

SUMMARY OF THE INVENTION

The apparatus comprises a flat bottom track for transporting, on its upper surface, cylindrical work pieces which have longitudinal flats and which are rotationally oriented at random. A gate member, having a generally inverted V-shaped notch in its lower edge, is disposed over the track. The apex of the notch is substantially centered over the track and the height of the gate is set so that the two sides of the said V-shaped notch are adapted to clear those work pieces which rest on their axial flats and to stop the ones lying on part of their curved surfaces. The track can be vibrated to cause the work pieces to rotate about their longitudinal axis until they come to a rotational rest lying on their flats.

BRIEF DESCRIPTION OF THE DRAWINGS

In FIG. 1, cylindrical work pieces 10 and 12 having a longitudinal flat are riding on a vibratory track 14 towards a sorting gate 16. The work pieces rest on an upper surface 18 of the track 14 and are guided by an upstanding lateral wall 19. The surface 18 is substantially flat and slightly inclined downwardly towards the wall 19 so as to prevent the work pieces from falling off the surface 18.

Figure 1:
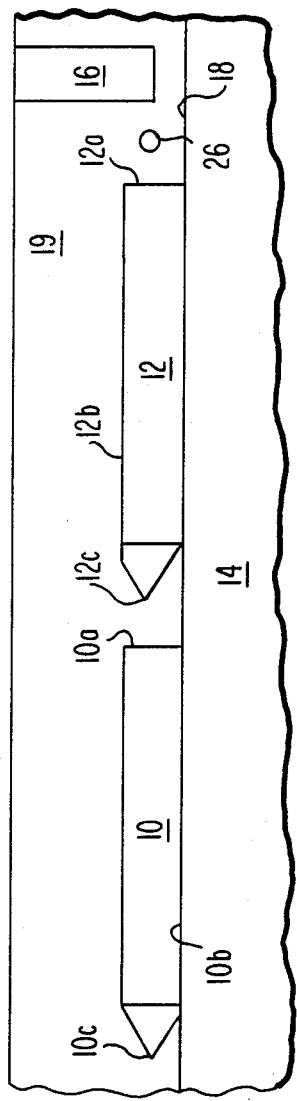
FIG. 1 is a longitudinal side view of a track carrying cylindrical work pieces having a longitudinal flat.

The work pieces are generally cylindrical bodies having a longitudinal flat 10b or 12b. Each work piece has a pointed end 10c or 12c and a flat end 10a or 12a at the other end. Some work pieces, such as the piece 10, rest with their longitudinal flat 10b down while others, such as piece 12, have their longitudinal flat 12b facing other than down, e.g. upward.

The cylindrical work pieces are longitudinally aligned on the track 14 with their flat ends 10a and 12a in the direction of the gate 16. This arrangement has been obtained because the cylindrical work pieces have previously passed through a section of the automated equipment which eliminated the ones having their pointed ends 10c or 12c in the direction of the gate 16.

The vibratory track is vibrated by any suitable system known in the art of vibrating tracks. The vibration of the track causes the work pieces to move longitudinally and propels them towards the gate 16. The vibration also causes the cylindrical pieces to rotate on their axes until they rest on their axial flats. However, some pieces will reach the gate 16 before reaching the desired rotational orientation and will have to be eliminated from the track.

Figure 2:
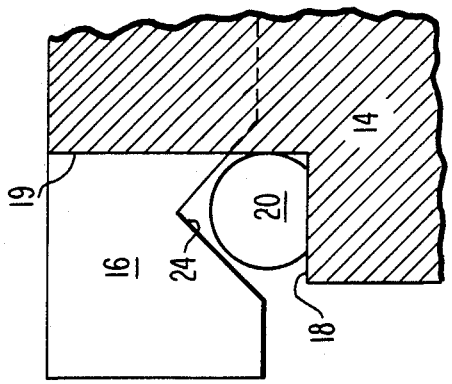
FIG. 2 is a cross-sectional view of the track carrying a cylindrical work piece resting on its longitudinal flat.

As shown in FIG. 2, the gate 16 is mounted across the track 14 and over the surface 18. The gate is made essentially of a plate with a notch 24 in its lower edge. The notch is generally V-shaped and is set at a predetermined distance above the surface 18. This distance is such that a work piece 20 resting on its longitudinal flat is able to pass under the notch 24 of the gate 16. The slopes of the inverted V-shaped notch are substantially tangential to the cylindrical surface of the work piece 20 when the flat is down. The slopes of the notch slightly clear the cylindrical work piece to allow its passage therethrough.

Figure 3:
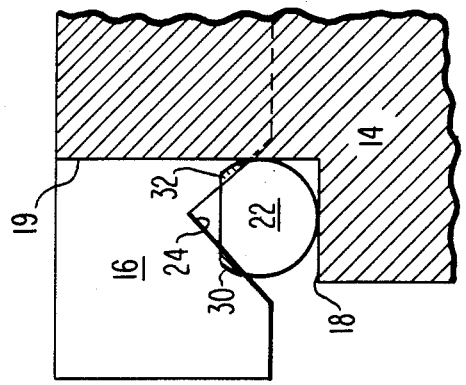
FIG. 3 is a cross-sectional view as in FIG. 2 with the work piece resting on its circular periphery with its longitudinal flat up.

As shown in FIG. 3, the predetermined distance at which the gate 16 is mounted above the track is such that a work piece 22, having its longitudinal flat other than down, resting, i.e. on any part of its curved surface, will be stopped by the gate 16 and prevented from passing the notch 24.

The work piece 22 which has reached the gate 16 and which cannot get through the notch 24 is pushed off the track by an air stream coming through an orifice 26 shown in FIG. 1. The orifice 26 is located in front and adjacent the gate 16 and substantially at a height corresponding to the axis of the piece 22. The air stream is controlled so as to expel short air spurts from the orifice 26 when an unwanted piece is stopped by gate 16.

In a preferred embodiment for discarding an unwanted work piece, control means is used to periodically expel air spurts at time intervals corresponding to the passage of every two or three work pieces. The piece 22 which is stopped by the gate 16 will be blown off the track. It is obvious that with this procedure, an acceptable piece such as 20 which is about to enter in the notch 24 of the gate will also be thrown off the track if the air spurt is then expelled but all the discarded pieces fall into a bowl and eventually return to an earlier stage of the sorting process.

Mechanical ejecting devices may also be contemplated for ejecting the work pieces from the track.

A work piece going through the gate has a very small clearance and because it is vibrated by the track 14, it may be slowed down by friction. However, the following piece helps push the one passing through the gate.

It is understood that the transportation of the pieces according to the present invention is not restricted to a vibrating track. A variety of known conveyors such as belt conveyors can be used for the purpose of moving the pieces through the gate.

In the drawings, the notched portion 24 of the gate 16 is illustrated as an inverted V-shaped notch forming an angle of 90°. This angle may vary considerably without changing the function of the gate. The sloping sides of the notch may also be curved.

Although the gate has been described as a plate having a notch formed by sloping sides, the essential portions of the gate are the abutments corresponding to the parts facing the hatched surfaces 30 and 32 shown in FIG. 3.

These hatched surfaces correspond to the two corners of the segment formed by the cross-section of the work piece when the latter has its axial flat in other than the down position. Only one of the hatched surfaces is necessary if the pieces are carried with the flat upward and tilted.

The invention applies to any cylindrical work piece which has an axial flat. It is particularly useful in sorting styli such as used in playback of video or audio disc recordings.

What is claimed is:

1. An apparatus for sorting cylindrical work pieces having an axial flat along the length thereof and selecting the ones lying on said flat, the said appartus comprising:

a flat vibratory track for longitudinally moving said cylindrical pieces in the direction of their longitudinal axes and for rotating said pieces about their longitudinal axes until they come to rotational rest lying on their flats, a gate member disposed over said track and transversely thereof, said gate member comprising a notched plate having an inverted V-shaped notch and vertically positioned to permit only those pieces lying on their flats to pass longitudinally through the notch and to block from passage therethrough those not lying on their flats, air means, in front of and adjacent to said gate member, for periodically directing a stream of air transversely of said track for removing work pieces from said track.

* * * * *